United States Patent
Reisacher et al.

(10) Patent No.: US 8,124,672 B2
(45) Date of Patent: Feb. 28, 2012

(54) SOLID PIGMENT PREPARATIONS CONTAINING WATER-SOLUBLE ANIONIC SURFACE-ACTIVE ADDITIVES THAT COMPRISE CARBOXYLATE GROUPS

(75) Inventors: Hansulrich Reisacher, Maxdorf (DE); Ingo Klopp, Weisenheim (DE); Stephan Hueffer, Ludwigshafen (DE); Matthias Klueglein, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1050 days.

(21) Appl. No.: 10/531,586

(22) PCT Filed: Nov. 11, 2003

(86) PCT No.: PCT/EP03/12554
§ 371 (c)(1),
(2), (4) Date: Apr. 18, 2005

(87) PCT Pub. No.: WO2004/046251
PCT Pub. Date: Jun. 3, 2004

(65) Prior Publication Data
US 2006/0000392 A1    Jan. 5, 2006

(30) Foreign Application Priority Data
Nov. 18, 2002 (DE) .................................. 102 53 804

(51) Int. Cl.
*C09D 11/00* (2006.01)
*C08K 3/20* (2006.01)
*C08K 5/00* (2006.01)
(52) U.S. Cl. ...... 523/161; 523/509; 106/506; 106/31.56
(58) Field of Classification Search .................. 106/400, 106/401, 506, 31.56, 436, 447; 523/509, 523/161; 264/328.18
See application file for complete search history.

(56) References Cited

U.S. PATENT DOCUMENTS

| | | | | |
|---|---|---|---|---|
| 3,841,888 A | | 10/1974 | Belde et al. | |
| 3,947,287 A | | 3/1976 | Belde et al. | |
| 4,002,593 A | * | 1/1977 | Jones | 523/318 |
| 4,116,924 A | * | 9/1978 | Peabody | 524/270 |
| 4,234,466 A | * | 11/1980 | Takahashi et al. | 523/509 |
| 4,464,203 A | * | 8/1984 | Belde et al. | 106/413 |
| 5,112,404 A | * | 5/1992 | Sommer et al. | 106/506 |
| 5,852,073 A | * | 12/1998 | Villiger et al. | 523/161 |
| 6,063,182 A | | 5/2000 | Baebler | |
| 6,110,266 A | * | 8/2000 | Gonzalez-Blanco et al. | 106/31.65 |
| 6,569,231 B1 | | 5/2003 | Mathias | |

FOREIGN PATENT DOCUMENTS

| | | |
|---|---|---|
| CN | 1210873 | 3/1999 |
| CN | 1345357 | 4/2002 |
| DE | 39 14 384 | 10/1990 |
| DE | 199 05 269 | 8/2000 |
| DE | 100 35 494 | 1/2002 |
| DE | 102 27 657 | 1/2004 |
| DE | 102 33 081 | 2/2004 |
| EP | 0 058 865 | 9/1982 |
| EP | 0 256 427 | 2/1988 |
| EP | 1 103 173 | 5/2001 |
| WO | WO 00/61689 | 10/2000 |
| WO | 03/066743 | 8/2003 |

* cited by examiner

*Primary Examiner* — Shuangyi Abu Ali
(74) *Attorney, Agent, or Firm* — Oblon, Spivak, McClelland, Maier & Neustadt, L.L.P.

(57) ABSTRACT

Disclosed are solid pigment preparations containing (A) 60 to 95 per weight of at least one pigment, (B) 5 to 40 percent by weight of at least one water-soluble anionic surface-active additive from the group of the homopolymers and copolymers of ethylenically unsaturated monocarboxylic acids and/or ethylenically unsaturated dicarboxylic acids which can additionally contain monopolymerized vinyl monomers having no acid function, the alkoxylation products of said homopolymers and copolymers, and the salts of said homopolymers and copolymers and the alkoxylation products thereof, and (C) 0 to 20 percent by weight of at least one nonionic surface-active polyether-based additive as essential components. Also disclosed are a method for the production thereof and methods for dyeing macromolecular organic and inorganic materials.

9 Claims, No Drawings

SOLID PIGMENT PREPARATIONS CONTAINING WATER-SOLUBLE ANIONIC SURFACE-ACTIVE ADDITIVES THAT COMPRISE CARBOXYLATE GROUPS

BACKGROUND OF THE INVENTION

Field of the Invention

The present invention relates to solid pigment preparations comprising as essential constituents
 (A) from 60% to 95% by weight of at least one pigment,
 (B) from 5% to 40% by weight of at least one water-soluble anionic surface-active additive selected from the group of homo- and copolymers of ethylenically unsaturated monocarboxylic acids and/or ethylenically unsaturated dicarboxylic acids with or without vinyl monomers comprising no acid function, alkoxylation products of these homo- and copolymers and salts of these homo- and copolymers and their alkoxylation products, and
 (C) from 0% to 20% by weight of at least one nonionic surface-active additive based on polyethers.

The present invention further relates to the production of these pigment preparations and to their use for pigmenting macromolecular organic and inorganic materials and also plastics.

Description of the Background

Liquid systems such as coatings, varnishes, emulsion paints and printing inks are customarily colored using pigment formulations which comprise water, organic solvent or mixtures thereof. As well as anionic, cationic, nonionic or amphoteric dispersants, these pigment formulations generally have to be additized with further assistants, such as dried-crust inhibitors, freeze resistance enhancers, thickeners and anti-skinners, for stabilization.

There is a need for novel pigment preparations which are comparable to the liquid formulations with regard to color properties and dispersibility, but do not require the additions mentioned and are easier to handle. However, simply drying the liquid formulations does not provide solid pigment preparations having comparable performance properties.

The pigmentation of plastics requires complete dispersion of the pigment in the plastic for the development of maximum color strength and color effect. For the pulverulent pigments typically used such dispersion requires appropriate know-how and a high input of shearing energy and therefore is costly. When the plastics processor does not possess this know-how and the requisite complicated and costly dispersion equipment, the pigmented plastics will often contain specks of incompletely dispersed pigment agglomerates, be difficult to spin and/or possess high pressure-filter values. Many plastics processors therefore employ masterbatches. A masterbatch is a typically solid, concentrated pigment formulation in a plastics matrix which is solid at room temperature and meltable and in which the pulverulent pigment is present in a stage of complete dispersion and hence in a fine state of subdivision; that is, the energy needed to disperse the pulverulent pigment has already been invested to produce the masterbatch.

DE-A-39 14 384 describes pigment preparations which, as well as the finely divided pigment (not less than 3.9% by weight), comprise basic pigment derivatives and (not more than 9.5% by weight) of phosphoric esters of polyethylene glycols and of alkylene oxide adducts with oxo process and fatty alcohols and are used for producing flowable printing inks and stock pastes.

EP-A-1 103 173, inter alia, mentions anionically modified phenol-styrene polyglycol ethers as dispersants for solid pigment preparations used as colorants for seed dressing. However, the explicitly disclosed pigment preparations only comprise nonionic dispersants based on reaction products of hydrogenated castor oil with ethylene oxide.

DE-A-100 35 494 discloses solid formulations of metal complex pigments with included melamine. Anionic, cationic, amphoteric and nonionic dispersants are mentioned as useful, but the dispersant actually used is a sulfated ethoxylated fatty alcohol.

DE-A-199 05 269 describes solid pigment formulations which comprise dispersants based on nonionic modified phenol-styrene polyglycol ethers or mixtures of ethoxylated castor oil with minor amounts of these ethers or of phosphonic esters and additionally always a thickener based on optionally partially hydrogenated polyvinyl alcohol or on anionic polyhydroxy compounds and are used for pigmenting waterborne application media.

EP-A-256 427 concerns pigment preparations for cosmetic articles that comprise mixtures of anionic dispersants based on alkylglycol ether sulfates and phosphoric esters of optionally ethoxylated fatty alcohols; the sulfates are always present in excess in the mixtures.

DE-A-102 27 657 and 102 33 081, which were unpublished at the priority date of the present invention, disclose solid pigment preparations which comprise anionic surface-active additives based on phosphoric, phosphonic, sulfuric and/or sulfonic esters of polyethers and their salts and also their use for pigmentation of macromolecular organic and inorganic materials and also plastics.

EP-A-58 865 discloses pigment formulations which are prepared by precipitating water-insoluble salts of anionic polymers with polyvalent metal cations onto the pigment particles.

SUMMARY OF THE INVENTION

It is an object of the present invention to provide solid pigment preparations having altogether advantageous application properties, especially high color strength and particularly good dispersibility in a wide variety of application media.

We have found that this object is achieved by pigment preparations comprising as essential constituents
 (A) from 60% to 95% by weight of at least one pigment,
 (B) from 5% to 40% by weight of at least one water-soluble anionic surface-active additive selected from the group of homo- and copolymers of ethylenically unsaturated monocarboxylic acids and/or ethylenically unsaturated dicarboxylic acids with or without vinyl monomers comprising no acid function, alkoxylation products of these homo- and copolymers and salts of these homo- and copolymers and their alkoxylation products, and
 (C) from 0% to 20% by weight of at least one nonionic surface-active additive based on polyethers.

DETAILED DESCRIPTION OF THE PREFERRED EMBODIMENTS

The present invention further provides a process for producing pigment preparations, which comprises wet-comminuting the pigment (A) in aqueous suspension in the presence of some or all of additive (B) and optionally (C) and then drying the suspension, if necessary after the rest of additive (B) and optionally (C) has been added.

The present invention yet further provides a process for pigmenting macromolecular organic and inorganic materials, which comprises incorporating pigment preparations in these materials by stirring or shaking.

The present invention finally provides a process for pigmenting plastics, which comprises incorporating these pigment preparations in the plastics by extrusion, rolling, kneading or grinding.

The pigment preparations of the present invention comprise as essential constituents a pigment (A) and a water-soluble anionic surface-active additive (B) and also, if desired, a nonionic additive (C).

Component (A) in the pigment preparations of the present invention may be an organic pigment or an inorganic pigment. It will be appreciated that the pigment preparations may also comprise mixtures of various organic or various inorganic pigments or mixtures of organic and inorganic pigments.

The pigments are present in finely divided form. Accordingly the pigments typically have average particle sizes from 0.1 to 5 μm.

The organic pigments are typically organic chromatic and black pigments. Inorganic pigments can likewise be color pigments (chromatic, black and white pigments) and also luster pigments and the inorganic pigments typically used as fillers.

There now follow examples of suitable organic color pigments:

| | |
|---|---|
| monoazo pigments: | C.I. Pigment Brown 25; |
| | C.I. Pigment Orange 5, 13, 36, 38, 64 and 67; |
| | C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251; |
| | C.I. Pigment Yellow 1, 3, 62, 65, 73, 74, 97, 120, 151, 154, 168, 181, 183 and 191; |
| | C.I. Pigment Violet 32; |
| disazo pigments: | C.I. Pigment Orange 16, 34, 44 and 72; |
| | C.I. Pigment Yellow 12, 13, 14, 16, 17, 81, 83, 106, 113, 126, 127, 155, 174, 176, 180 and 188; |
| disazo condensation pigments: | C.I. Pigment Yellow 93, 95 and 128; |
| | C.I. Pigment Red 144, 166, 214, 220, 221, 242 and 262; |
| | C.I. Pigment Brown 23 and 41; |
| anthanthrone pigments: | C.I. Pigment Red 168; |
| anthraquinone pigments: | C.I. Pigment Yellow 147, 177 and 199; |
| | C.I. Pigment Violet 31; |
| anthrapyrimidine pigments: | C.I. Pigment Yellow 108; |
| quinacridone pigments: | C.I. Pigment Orange 48 and 49; |
| | C.I. Pigment Red 122, 202, 206 and 209; |
| | C.I. Pigment Violet 19; |
| quinophthalone pigments: | C.I. Pigment Yellow 138; |
| diketopyrrolopyrrole pigments: | C.I. Pigment Orange 71, 73 and 81; |
| | C.I. Pigment Red 254, 255, 264, 270 and 272; |
| dioxazine pigments: | C.I. Pigment Violet 23 and 37; |
| | C.I. Pigment Blue 80; |
| flavanthrone pigments: | C.I. Pigment Yellow 24; |
| indanthrone pigments: | C.I. Pigment Blue 60 and 64; |
| isoindoline pigments: | C.I. Pigments Orange 61 and 69; |
| | C.I. Pigment Red 260; |
| | C.I. Pigment Yellow 139 and 185; |
| isoindolinone pigments: | C.I. Pigment Yellow 109, 110 and 173; |
| isoviolanthrone pigments: | C.I. Pigment Violet 31; |
| metal complex pigments: | C.I. Pigment Red 257; |
| | C.I. Pigment Yellow 117, 129, 150, 153 and 177; |
| | C.I. Pigment Green 8; |
| perinone pigments: | C.I. Pigment Orange 43; |
| | C.I. Pigment Red 194; |
| perylene pigments: | C.I. Pigment Black 31 and 32; |
| | C.I. Pigment Red 123, 149, 178, 179, 190 and 224; |
| | C.I. Pigment Violet 29; |
| phthalocyanine pigments: | C.I. Pigment Blue 15, 15:1, 15:2, 15:3, 15:4, 15:6 and 16; |
| | C.I. Pigment Green 7 and 36; |
| pyranthrone pigments: | C.I. Pigment Orange 51; |
| | C.I. Pigment Red 216; |
| pyrazoloquinazolone pigments: | C.I. Pigment Orange 67; |
| | C.I. Pigment Red 251; |
| thioindigo pigments: | C.I. Pigment Red 88 and 181; |
| | C.I. Pigment Violet 38; |
| triarylcarbonium pigments: | C.I. Pigment Blue 1, 61 and 62; |
| | C.I. Pigment Green 1; |
| | C.I. Pigment Red 81, 81:1 and 169; |
| | C.I. Pigment Violet 1, 2, 3 and 27; |

C.I. Pigment Black 1 (aniline black);
C.I. Pigment Yellow 101 (aldazine yellow);
C.I. Pigment Brown 22.

Examples of suitable inorganic color pigments are:

| | |
|---|---|
| white pigments: | titanium dioxide (C.I. Pigment White 6), zinc white, pigment grade zinc oxide; zinc sulfide, lithopone; |
| black pigments: | iron oxide black (C.I. Pigment Black 11), iron manganese black, spinel black (C.I. Pigment Black 27); carbon black (C.I. Pigment Black 7); |
| chromatic pigments: | chromium oxide, chromium oxide hydrate green; chrome green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt violet and manganese violet; red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red; brown iron oxide (C.I. Pigment Brown 6 and 7), mixed brown, spinel phases and corundum phases (C.I. Pigment Brown 29, 31, 33, 34, 35, 37, 39 and 40), chromium titanium yellow (C.I. Pigment Brown 24), chrome orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184). |

Examples of inorganic pigments typically used as fillers are transparent silicon dioxide, ground quartz, aluminum oxide, aluminum hydroxide, natural micas, natural and precipitated chalk and barium sulfate.

Luster pigments are platelet-shaped pigments having a monophasic or polyphasic construction whose color play is marked by the interplay of interference, reflection and absorption phenomena. Examples are aluminum platelets and aluminum, iron oxide and mica platelets bearing one or more coats, especially of metal oxides.

Component (B) of the solid pigment preparations according to the present invention is at least one water-soluble anionic surface-active additive selected from the group of homo- and copolymers of ethylenically unsaturated monocarboxylic acids and/or ethylenically unsaturated dicarboxylic acids with or without vinyl monomers comprising no acid function, alkoxylation products of these homo- and copolymers and salts of these homo- and copolymers and their alkoxylation products.

Examples of the carboxyl-containing monomers and of the vinyl monomers are:
acrylic acid, methacrylic acid and crotonic acid;
maleic acid, maleic anhydride, maleic monoesters, maleic monoamides, reaction products of maleic acid with diamines which may have been oxidized to derivatives containing amine oxide groups, and fumaric acid, of which maleic acid, maleic anhydride and maleic monoamides are preferred;
styrenics, such as styrene, methylstyrene and vinyltoluene; ethylene, propylene, isobutene, diisobutene and butadiene; vinyl ethers, such as polyethylene glycol monovinyl ether; vinyl esters of linear or branched monocarboxylic acids, such as vinyl acetate and vinyl propionate; alkyl esters and aryl esters of ethylenically unsaturated monocarboxylic acids, especially acrylic and methacrylic esters, such as methyl, ethyl, propyl, isopropyl, butyl, pentyl, hexyl, 2-ethylhexyl, nonyl, lauryl or hydroxyethyl (meth)acrylate and also phenyl, naphthyl or benzyl (meth)acrylate; dialkyl esters of ethylenically unsaturated dicarboxylic acids, such as dimethyl, diethyl, dipropyl, diisopropyl, dibutyl, dipentyl, dihexyl, di-2-ethylhexyl, dinonyl, dilauryl or di-2-hydroxyethyl maleate or fumarate; vinylpyrrolidone; acrylonitrile and methacrylonitrile, of which styrene, isobutene, diisobutene, acrylic esters and polyethylene glycol monovinyl ether are preferred.

Preferred homopolymers of these monomers are in particular polyacrylic acids, for example. The copolymers of the monomers mentioned may be copolymerized from two or more and especially from three different monomers. The copolymers may be random copolymers, alternating copolymers, block copolymers or graft copolymers. Preferred copolymers are stryene-acrylic acid, acrylic acid-maleic acid, acrylic acid-methacrylic acid, butadiene-acrylic acid, isobutene-maleic acid, diisobutene-maleic acid, and styrene-maleic acid copolymers, which may each additionally comprise units derived from acrylic ester and/or maleic ester monomer.

Preferably, the carboxyl groups of nonalkoxylated homo- and copolymers are at least partly present in salt form in order that solubility in water may be ensured. Useful salts include alkali metal salts, such as sodium and potassium salts, and ammonium salts.

Typically, nonalkoxylated polymeric additives (B) have average molecular weights $M_w$ in the range from 900 to 250 000. Since the molecular weight ranges which are particularly suitable for the individual addition polymers depend on their composition, as will be appreciated. The molecular weights will now be specified for various polymers by way of example: polyacrylic acids: $M_w$ from 900 to 250 000; styrene-acrylic acid copolymers: $M_w$ from 1000 to 50 000; acrylic acid-methacrylic acid copolymers: $M_w$ from 1000 to 250 000; acrylic acid-maleic acid copolymers: $M_w$ from 2000 to 70 000.

As well as the carboxyl-containing polymers themselves, their alkoxylation products are likewise of particular interest for use as (B) additives.

By alkoxylation products of the carboxyl-containing polymers are meant herein for the purposes of the present invention in particular the polymers after partial or (insofar as possible) full esterification with polyether alcohols. Generally, the degree of esterification of these polymers is in the range from 30 to 80 mol %.

The esterification may usefully be carried out in particular with the polyether alcohols themselves, preferably polyethylene glycols and polypropylene glycols, and also their singly tipped derivatives, in particular the corresponding monoethers, such as monoaryl ethers, eg monophenyl ether, and especially mono-$C_1$-$C_{26}$-alkyl ethers, for example fatty alcohol etherified ethylene and propylene glycols, and the polyether amines which are preparable for example by conversion of a terminal OH group of the corresponding polyether alcohols or by polyaddition of alkylene oxides onto preferably primary aliphatic amines. Preference is here given to polyethylene glycols, polyethylene glycol monoether and polyether amines. The average molecular weights $M_n$ of the polyether alcohols used and their derivatives are typically in the range from 200 to 10 000.

By controlling the ratio of polar to apolar groups it is possible to tune the surface-active properties of the (B) additives in a specifically targeted manner.

Such anionic surface-active additives (B) are likewise known and commercially available for example under the names of Sokalan® (BASF), Joncryl® (Johnson Polymer), Alcosperse® (ALco), Geropon® (Rhodia), Good-Rite®

(Goodrich), Neoresin® (Avecia), Orotan® and Morez® (Rohm & Haas), Disperbyk® (Byk) and also Tegospers® (Goldschmidt).

The pigment preparations according to the present invention may additionally comprise nonionic surface-active additives based on polyethers as a component (C).

As well as unmixed polyalkylene oxides, preferably $C_2$-$C_4$-alkylene oxides and phenyl-substituted $C_2$-$C_4$-alkylene oxides, in particular polyethylene oxides, polypropylene oxides and poly(phenylethylene oxide)s, it is particularly block copolymers, in particular suitability comprising polypropylene oxide and polyethylene oxide blocks or else poly(phenylene oxide) and polyethylene oxide blocks, but also random copolymers of these alkylene oxides which are useful.

They, like the unmixed polyalkylene oxides, are obtainable by polyaddition of alkylene oxides to starter molecules, such as saturated or unsaturated aliphatic and aromatic alcohols, phenol or naphthol, which can be substituted by alkyl, in particular $C_1$-$C_{12}$ alkyl, preferably $C_4$-$C_{12}$ or $C_1$-$C_4$ alkyl, saturated or unsaturated aliphatic and aromatic amines, saturated or unsaturated aliphatic carboxylic acids and carboxamides. It is customary to use from 1 to 300 mol and preferably from 3 to 150 mol of alkylene oxide per mole of starter molecule.

Suitable aliphatic alcohols comprise in general from 6 to 26 carbon atoms and preferably from 8 to 18 carbon atoms and can have an unbranched, branched or cyclic structure. Examples are octanol, nonanol, decanol, isodecanol, undecanol, dodecanol, 2-butyloctanol, tridecanol, isotridecanol, tetradecanol, pentadecanol, hexadecanol (cetyl alcohol), 2-hexyldecanol, heptadecanol, octadecanol, (stearyl alcohol), 2-heptylundecanol, 2-octyidecanol, 2-nonyltridecanol, 2-decyltetradecanol, oleyl alcohol and 9-octadecenol and also mixtures of these alcohols, such as $C_8/C_{10}$, $C_{13}/C_{15}$ and $C_{16}/C_{18}$ alcohols, and cyclopentanol and cyclohexanol. Of particular interest are the saturated or unsaturated fatty alcohols obtained from natural raw materials by fat hydrolysis and reduction and the synthetic fatty alcohols from the oxo process. The alkylene oxide adducts with these alcohols typically have average molecular weights $M_n$ from 200 to 5 000.

Examples of the abovementioned aromatic alcohols include not only unsubstituted phenol and □- and □-naphthol but also hexylphenol, heptylphenol, octylphenol, nonylphenol, isononylphenol, undecylphenol, dodecylphenol, di- and tributylphenol and dinonylphenol.

Suitable aliphatic amines correspond to the abovementioned aliphatic alcohols. Again of particular importance here are the saturated and unsaturated fatty amines which preferably have from 14 to 20 carbon atoms. Examples of suitable aromatic amines are aniline and its derivatives.

Useful aliphatic carboxylic acids include especially saturated and unsaturated fatty acids which preferably contain from 14 to 20 carbon atoms and fully hydrogenated, partially hydrogenated and unhydrogenated resin acids and also polyfunctional carboxylic acids, for example dicarboxylic acids, such as maleic acid.

Suitable carboxamides are derived from these carboxylic acids.

As well as alkylene oxide adducts with monofunctional amines and alcohols it is alkylene oxide adducts with at least bifunctional amines and alcohols which are of very particular interest.

The at least bifunctional amines preferably have from 2 to 5 amine groups and conform in particular to the formula $H_2N$—$(R$—$NR')_n$—$H$ (R: $C_2$-$C_6$-alkylene; $R^1$: hydrogen or $C_1$-$C_6$-alkyl; n: 1-5).

Specific examples are: ethylenediamine, diethylenetriamine, triethylenetetramine, tetraethylenepentamine, 1,3-propylenediamine, dipropylenetriamine, 3-amino-1-ethylene-aminopropane, hexamethylenediamine, dihexamethylenetriamine, 1,6bis(3-aminopropyl-amino)hexane and N-methyidipropylenetriamine, of which hexamethylenediamine and diethylenetriamine are more preferable and ethylenediamine is most preferable.

These amines are preferably reacted first with propylene oxide and then with ethylene oxide. The ethylene oxide content of the block copolymers is typically about 10-90% by weight.

The average molecular weights $M_n$ of the block copolymers based on polyamines are generally in the range from 1 000 to 40 000 and preferably in the range from 1 500 to 30 000.

The at least bifunctional alcohols preferably have from two to five hydroxyl groups. Examples are $C_2$-$C_6$-alkylene glycols and the corresponding di- and polyalkylene glycols, such as ethylene glycol, 1,2-propylene glycol, 1,3-propylene glycol, 1,2-butylene glycol, 1,4-butylene glycol, 1,6-hexylene glycol, dipropylene glycol and polyethylene glycol, glycerol and pentaerythritol, of which ethylene glycol and polyethylene glycol are more preferable and propylene glycol and dipropylene glycol are most preferable.

Particularly preferred alkylene oxide adducts with at least bifunctional alcohols have a central polypropylene oxide block, ie are based on a propylene glycol or polypropylene glycol which is initially reacted with further propylene oxide and then with ethylene oxide. The ethylene oxide content of the block copolymers is typically in the range from 10% to 90% by weight.

The average molecular weights $M_n$ of the block copolymers based on polyhydric alcohols are generally in the range from 1 000 to 20 000 and preferably in the range from 1 000 to 15 000.

Such alkylene oxide block copolymers are known and commercially available for example under the names of Tetronic® and Pluronic® (BASF).

The pigment preparations of the present invention comprise from 60% to 95% by weight of component (A), from 5% to 40% by weight of component (B) and from 0% to 20% by weight of component (C).

When the pigment preparations of the present invention do not comprise any nonionic additive (C), the preferred compositions depend on the type of pigment they comprise:

from 70% to 90% by weight and especially from 70% to 85% by weight of organic pigment (A) and from 10% to 30% by weight and especially from 15% to 30% by weight of additive (B); from 60% to 80% by weight and especially from 60% to 75% by weight of transparent iron oxide pigment (A) and from 20% to 40% by weight and especially from 25% to 40% by weight of additive (B);

from 70% to 95% by weight and especially from 75% to 95% by weight of inorganic pigment (A) (other than transparent iron oxide pigment) and from 5% to 30% by weight and especially from 5% to 25% by weight of additive (B).

When a nonionic additive (C) is comprised, the composition of the pigment preparations according to the present invention is preferably from 60% to 85% by weight of pigment (A), from 5% to 20% by weight of anionic additive (B) and from 5% to 15% by weight of nonionic additive (C).

The pigment preparations of the present invention are advantageously obtainable by the production process of the present invention by wet-comminuting the pigment (A) in aqueous suspension in the presence of some or all of additive (B) and optionally (C) and then drying the suspension, if necessary after the rest of additive (B) and optionally (C) has been added.

Pigment (A) can be used in the process of the present invention as a dry powder or in the form of a presscake.

The pigment (A) used is preferably a finished product, ie the primary particle size of the pigment has already been adjusted to the desired application value. This finish is advisable in the case of organic pigments especially, since the as-synthesized crude material is generally not directly suitable for use. In the case of inorganic pigments, for example in the case of oxide and bismuth vanadate pigments, the primary particle size can also be adjusted in the course of the synthesis of the pigment, so that the as-synthesized pigment suspensions can be used directly for producing the pigment preparations to be used according to the present invention.

Since the finished pigment (A) typically reagglomerates in the course of drying or on the filter assembly, it is subjected to wet comminution in aqueous suspension, eg grinding in a stirred media mill.

The wet comminution should be carried out in the presence of at least a portion of the additive (B and optionally C) comprised in the ready-produced pigment preparation, and it is preferable to add the entire amount of additive (B and optionally C) prior to the wet comminution.

The particle size of the pigment preparations of the present invention can be controlled to a specific value, depending on the chosen method of drying the aqueous pigment suspension—spray granulation and fluidized bed drying, spray drying, drying in a paddle dryer, evaporation and subsequent comminution.

Spray and fluidized bed granulation may produce coarsely divided granules having average particle sizes from 50 to 5 000 μm, and especially from 100 to 1 000 μm. Spray drying typically produces granules having average particle sizes <20 μm. Finely divided preparations are obtainable by drying in a paddle dryer and by evaporation with subsequent grinding. Preferably, however, the pigment preparations of the present invention are in granule form.

Spray granulation is preferably carried out in a spray tower using a one-material nozzle. Here, the suspension is sprayed in the form of relatively large drops, and the water evaporates. The additives melt at the drying temperatures and so lead to the formation of a substantially spherical granule having a particularly smooth surface (BET values generally $\square 15\,m^2/g$, and especially $\square m^2/g$).

The gas inlet temperature in the spray tower is generally in the range from 180 to 300° C. and preferably in the range from 150 to 300° C. The gas outlet temperature is generally in the range from 70 to 150° C. and preferably in the range from 70 to 130° C.

The residual moisture content of the granular pigment obtained is preferably <2% by weight.

The pigment preparations of the present invention are notable in use in application media having a liquid phase for their excellent color properties which are comparable to those of liquid pigment formulations, especially with regard to color strength, brilliance, hue and hiding power, and in particular for their stir-in characteristics, ie they can be dispersed in application media with a minimal input of energy, simply by stirring or shaking. This applies in particular to the coarsely divided pigment granules, which constitute the preferred embodiment of the pigment preparations of the present invention.

Compared with liquid pigment formulations, the pigment preparations of the present invention additionally have the following advantages: They have a higher pigment content. Whereas liquid formulations tend to change viscosity during storage and have to be admixed with preservatives and agents for enhancing the resistance to freezing and/or drying out (crusting), the pigment preparations of the present invention exhibit very good stability in storage. They are both economically and ecologically advantageous with regard to packaging, storage and transportation. Since they are solvent free, they are more flexible in use.

The pigment preparations of the present invention which are in granule form are notable for excellent attrition resistance, a minimal tendency to compact or clump, uniform particle size distribution, good pourability, flowability and meterability and also dustlessness in handling and application.

The pigment preparations of the present invention are very useful for pigmenting macromolecular organic and inorganic materials of any kind. Liquid application media in this context can be purely aqueous; comprise mixtures of water and organic solvents, for example alcohols; or be based exclusively on organic solvents, such as alcohols, glycol ethers, ketones, eg methyl ethyl ketone, amides, eg N-methylpyrrolidone and dimethylformamide, esters, eg ethyl acetate, butyl acetate and methoxypropyl acetate, or aromatic or aliphatic hydrocarbons, eg xylene, mineral oil and mineral spirits.

If desired, the preparations can initially be stirred into a solvent which is compatible with the particular application medium, again with minimal input of energy, and then be introduced into this application medium. For instance, slurries of pigment preparations in glycols or other solvents customary in the paint and coatings industry, such as methoxypropyl acetate, can be used to render the pigment preparations for aqueous systems compatible with hydrocarbonaceous systems or systems based on nitrocellulose.

Examples of materials which can be pigmented with the pigment preparations of the present invention include: coatings, for example architectural coatings, industrial coatings, automotive coatings, radiation-curable coatings; paints, including paints for building exteriors and building interiors, for example wood paints, lime washes, distempers, emulsion paints; solventborne printing inks, for example offset printing inks, flexographic printing inks, toluene gravure printing inks, textile printing inks, radiation-curable printing inks; waterborne inks, including inkjet inks; color filters; building materials (water is typically added only after building material and granular pigment have been dry mixed), for example silicate render systems, cement, concrete, mortar, gypsum; bitumen, caulks; cellulosic materials, for example paper, paperboard, cardboard, wood and woodbase, which can each be coated or otherwise finished; adhesives; film-forming polymeric protective colloids as used for example in the pharmaceutical industry; cosmetic articles; detergents.

The pigment preparations of the invention are very useful for coloring plastics. The following classes and types of plastics may be mentioned by way of example:

modified natural materials:
  thermosets, eg casein plastics; thermoplastics, eg cellulose nitrate, cellulose acetate, cellulose mixed esters and cellulose ethers;
synthetic plastics:
  polycondensates: thermosets, eg phenolic resin, urea resin, thiourea resin, melamine resin, unsaturated polyester resin, allylic resin, silicone, polyimide and polybenzimidazole; thermoplastics, eg polyamide, polycarbonate, polyester, polyphenylene oxide, polysulfone and polyvinyl acetal;
  addition polymers: thermoplastics, eg polyolefins, such as polyethylene, polypropylene, poly-1-butene and poly- 4-methyl-1-pentene, ionomers, polyvinyl chloride, polyvinylidene chloride, polymethyl methacrylate, polyacrylonitrile, polystyrene, polyacetal, fluoropolymers, polyvinyl alcohol, polyvinyl acetate and poly-p-xylylene and also copolymers, such as ethylene-vinyl acetate copolymers, styrene-acrylonitrile copolymers, acrylonitrile-butadiene-styrene copolymers, polyethylene glycol terephthalate and polybutylene glycol terephthalate;

polyadducts: thermosets, eg epoxy resin and crosslinked polyurethanes; thermoplastics, eg linear polyurethanes and chlorinated polyethers.

Advantageously, plastics are colorable with the pigment preparations of the invention by minimal energy input, for example by conjoint extrusion (preferably using a single- or twin-screw extruder), rolling, kneading or grinding. The plastics can be present at that stage as plastically deformable masses or melts and be processed into moldings, film and fiber.

The solid pigment preparations to be used according to the present invention are additionally notable in coloring plastics for altogether advantageous application properties, especially for good color properties, in particular high color strength and brilliance, and the good rheological properties of the plastics which have been colored with them, especially for low pressure-filter values (high filter lifetimes) and good spinnability.

EXAMPLES

Production and testing of pigment preparations according to the present invention The pigment preparations were produced by a suspension of x g of finished pigment (A), y g of additive (B) and optionally z g of additive (C) in 150 g of water (if pH □7, adjusted to pH=7 by addition of 25% by weight aqueous sodium hydroxide solution) being ball milled to a $d_{50}$ value of □1 μm and then spray dried in a laboratory spray tower (Mini Spray Dryer B-191, from Büchi; gas inlet temperature 170° C., gas outlet temperature 70° C.).

The color strength of the pigment preparations was determined colorimetrically in white reduction (reported in terms of the DIN 55986 coloring equivalents CEs) in a waterborne emulsion paint. To this end, a mixture of in each case 1.25 g of pigment preparation and 50 g of a waterborne styrene/acrylate-based test binder having a white pigment content of 16.4% by weight ($TiO_2$, Kronos 2043) (BASF test binder 00-1067) were homogenized in a 150 ml plastic cup by running a high speed stirrer at 1500 rpm for 3 min. The color obtained was then drawn down on a black and white test card using a 100 μm wire-wound film applicator and dried for 30 min.

The pigment preparations of the present invention exhibited color strengths which were comparable to those of the respective analogous commercially available aqueous formulations of the pigments.

The table hereinbelow lists the compositions of the pigment preparations produced. The content of the additives (B) and (C) is based on the dissolved polymer when the polymers were used in solution. The additives (B) and (C) used were as follows:

TABLE

| Ex. | Pigment (A) | x g | Additive (B) | y g | Additive (C) z g |
|---|---|---|---|---|---|
| 1 | P.Y. 184 | 90 | B4 | 10 | — |
| 2 | P.Y. 184 | 87.5 | B1 | 12.5 | — |
| 3 | P.Y. 184 | 87.5 | B2 | 12.5 | — |
| 4 | P.Y. 184 | 85 | B3 | 15 | — |
| 5 | P.Y. 184 | 85 | B8 | 15 | — |
| 6 | P.Y. 184 | 85 | B9 | 15 | — |
| 7 | P.Y. 184 | 85 | B5 | 15 | — |
| 8 | P.Y. 184 | 85 | B6 | 15 | — |
| 9 | P.Y. 184 | 90 | B10 | 10 | — |
| 10 | P.Y. 184 | 85 | B10 | 15 | — |
| 11 | P.Y. 184 | 85 | B10 | 7.5 | 7.5 |
| 12 | P.Y. 184 | 80 | B10 | 20 | — |
| 13 | P.Y. 184 | 85 | B12 | 15 | — |
| 14 | P.Y. 184 | 85 | B11 | 15 | — |
| 15 | P.Br. 24 | 90 | B4 | 10 | — |
| 16 | P.Br. 24 | 87.5 | B1 | 12.5 | — |
| 17 | P.Br. 24 | 87.5 | B2 | 12.5 | — |
| 18 | P.Br. 24 | 85 | B3 | 15 | — |
| 19 | P.Br. 24 | 85 | B8 | 15 | — |
| 20 | P.Br. 24 | 85 | B9 | 15 | — |
| 21 | P.Br. 24 | 85 | B7 | 15 | — |
| 22 | P.Br. 24 | 85 | B5 | 15 | — |
| 23 | P.Br. 24 | 85 | B6 | 15 | — |
| 24 | P.Br. 24 | 92.5 | B10 | 7.5 | — |
| 25 | P.Br. 24 | 90 | B10 | 10 | — |
| 26 | P.Br. 24 | 85 | B10 | 15 | — |
| 27 | P.Br. 24 | 85 | B10 | 7.5 | 7.5 |
| 28 | P.Br. 24 | 80 | B10 | 20 | — |
| 29 | P.Br. 24 | 85 | B12 | 15 | — |
| 30 | P.Br. 24 | 85 | B11 | 15 | — |
| 31 | P.Y. 42 | 87.5 | B2 | 12.5 | — |
| 32 | P.Y. 42 | 90 | B10 | 10 | — |
| 33 | P.Y. 42 | 90 | B10 | 5 | 5 |
| 34 | P.Y. 42 | 85 | B10 | 15 | — |
| 35 | P.Y. 42 | 80 | B10 | 20 | — |
| 36 | P.Y. 42 | 85 | B12 | 15 | — |
| 37 | P.Y. 42 | 85 | B11 | 15 | — |
| 38 | P.R. 101 | 87.5 | B2 | 12.5 | — |
| 39 | P.R. 101 | 90 | B10 | 10 | — |
| 40 | P.R. 101 | 85 | B10 | 15 | — |
| 41 | P.R. 101 | 80 | B10 | 20 | — |
| 42 | P.R. 101 | 85 | B12 | 15 | — |
| 43 | P.R. 101 | 85 | B12 | 7.5 | 7.5 |
| 44 | P.R. 101 | 85 | B11 | 15 | — |
| 45 | P.Y. 42 | 70 | B2 | 30 | — |
| 46 | P.Y. 42 | 70 | B10 | 30 | — |
| 47 | P.Y. 42 | 65 | B10 | 35 | — |
| 48 | P.Y. 42 | 70 | B11 | 30 | — |
| 49 | P.Y. 42 | 65 | B11 | 35 | — |
| 50 | P.B. 15:1 | 75 | B10 | 25 | — |
| 51 | P.B. 15:1 | 75 | B10 | 12.5 | 12.5 |
| 52 | P.B. 15:3 | 75 | B10 | 25 | — |
| 53 | P.B. 15:3 | 75 | B10 | 12.5 | 12.5 |
| 54 | P.R. 112 | 75 | B10 | 25 | — |
| 55 | P.R. 112 | 75 | B10 | 12.5 | 12.5 |
| 56 | P.R. 112 | 75 | B1 | 25 | — |
| 57 | P.Y. 74 | 75 | B1 | 25 | — |

We claim:
1. A solid pigment preparation, comprising:
(A) from 60% to 95% by weight of at least one pigment;
(B) from 5% to 40% by weight of at least one water-soluble anionic surface-active additive selected from the group consisting of homo- and copolymers of ethylenically unsaturated monocarboxylic acids and/or ethylenically unsaturated dicarboxylic acids with or without vinyl monomers comprising no acid function, alkoxylation products of these homo- and copolymers and salts of these homo- and copolymers and their alkoxylation products; and
(C) from 0% to 20% by weight of at least one nonionic surface-active additive based on polyethers.

2. The solid pigment preparation as claimed in claim 1, which is in the form of granules having an average particle size ranging from 50 to 5000 μm and a BET surface area of $\leq 15$ m$^2$/g.

3. The solid pigment preparation as claimed in claim 1, wherein the preparation is comprised of 60 to 85% by wt of pigment (A), 5 to 20% by wt of additive (B) and 5 to 15% by wt of additive (C).

4. The solid pigment preparation as claimed in claim 1, wherein the preparation is granulated to a surface which has a surface area of $\leq 15$ m$^2$/g.

5. A process for producing pigment preparations as claimed in claim 1, which comprises:
    wet-comminuting pigment (A) in aqueous suspension in the presence of some or all of additive (B) and optionally (C) and then drying the suspension, optionally, after the remainder of additive (B) and optionally (C) has been added.

6. A process for pigmenting macromolecular organic and inorganic materials, which comprises:
    incorporating pigment preparations as claimed in claim 1 in an organic or inorganic material by stirring or shaking the substances together.

7. A process as claimed in claim 5, for pigmenting coatings, paints, inks, including printing inks, and finish systems where the liquid phase comprises water, organic solvents or mixtures of water and organic solvents.

8. A process for pigmenting plastics, which comprises:
    incorporating pigment preparations as claimed in claim 1 into plastics by extrusion, rolling, kneading or grinding of the substances.

9. A solid pigment preparation, consisting essentially of:
    (A) from 60% to 95% by weight of at least one pigment;
    (B) from 5% to 40% by weight of at least one water-soluble anionic surface-active additive selected from the group consisting of homo- and copolymers of ethylenically unsaturated monocarboxylic acids and/or ethylenically unsaturated dicarboxylic acids with or without vinyl monomers comprising no acid function, alkoxylation products of these homo- and copolymers and salts of these homo- and copolymers and their alkoxylation products; and
    (C) from 0% to 20% by weight of at least one nonionic surface-active additive based on polyethers.

* * * * *